United States Patent [19]

Cook

[11] Patent Number: 5,710,661
[45] Date of Patent: Jan. 20, 1998

[54] INTEGRATED PANORAMIC AND HIGH RESOLUTION SENSOR OPTICS

[75] Inventor: Lacy G. Cook, El Segundo, Calif.

[73] Assignee: Hughes Electronics, Los Angeles, Calif.

[21] Appl. No.: 671,033

[22] Filed: Jun. 27, 1996

[51] Int. Cl.$^6$ .......................... G02B 17/00; G02B 13/00
[52] U.S. Cl. .......................... 359/364; 359/725; 359/732; 359/850
[58] Field of Search .................. 359/362–366, 359/725–733, 850–860; 250/334, 347, 353, 206.1, 206.3

[56] References Cited

U.S. PATENT DOCUMENTS

| | | | |
|---|---|---|---|
| 3,229,576 | 1/1966 | Rees | 359/364 |
| 5,033,833 | 7/1991 | Brown | 359/725 |
| 5,181,145 | 1/1993 | Eden | 359/366 |
| 5,502,309 | 3/1996 | Davis | 250/353 |
| 5,627,675 | 5/1997 | Davis et al. | 359/725 |

FOREIGN PATENT DOCUMENTS 1155544  6/1969  United Kingdom .................. 359/725

Primary Examiner—Thong Nguyen
Attorney, Agent, or Firm—Gordon R. Lindeen III; Georgann S. Grunebach; Wanda K. Denson-Low

[57] ABSTRACT

An optical apparatus monitors the entire panorama in low resolution and simultaneously monitors a selected portion of the panorama in high resolution. For the panoramic portion of the apparatus, a mirror having a convex surface of revolution with a hole therein is used. The higher resolution part of the apparatus uses a pointing mirror positioned above this hole. The panoramic and higher resolution views are imaged through lenses or optical components onto a detector. The panoramic view is imaged onto the detector as an annulus of light in which either higher or lower elevational angles of the panorama are imaged further away from the detector's center depending upon how the convex mirror is configured. In this way, the resolution of that portion of panorama that is imaged further away from the detector's center is enhanced. The higher resolution view is imaged to the center of the annulus. Thus, both panoramic and higher resolution portions of the desired scene share the same detector array without interruption, interference, or overlap.

20 Claims, 3 Drawing Sheets

INTEGRATED PANORAMIC AND HIGH RESOLUTION SENSOR OPTICS

BACKGROUND OF THE INVENTION

1. Field of the Invention

This invention relates to an optical apparatus for low resolution monitoring of the panorama, and simultaneous high resolution observation of a portion of the panorama.

2. Description of the Related Art

The surveillance and tracking of projectiles and other flying objects is a significant problem for the aerospace, astronomical and defense communities. Ideally, one would like accurate information on the position and trajectories of all objects at all times. Accurate information on the position of objects without knowledge of their velocities, for example, is of little interest for most applications. Likewise, exact knowledge of velocities without knowledge of the associated positions of the objects is also of limited utility. On the other hand, high resolution monitoring of all the activity in an entire hemisphere or even a substantial fraction of it is an extremely demanding task from the instrumentation point of view. The alternative, however, is to choose between either low resolution observation of a relatively large region or high resolution observation of a relatively small region, neither of which may be acceptable for a given application.

Monitoring the entire panorama requires either scanning across or observing the entire horizon. This can be challenging even under low resolution conditions. When the monitoring is done optically, a reflecting surface with higher order asphere terms such as a hyperboloid can be used to collect visible or invisible electromagnetic radiation (e.g., infrared) over the hemisphere. This can be followed by deconvolving the optical distortion that arises from the use of complex convex surfaces. One panoramic apparatus is outlined in U.S. Pat. No. 3,203,328 to Brueggemann, in which a negative power hyperboloidal mirror is used to image the panorama (i.e. collect and direct light rays, or photons). As seen in FIG. 3 of that patent, the hyperboloidal mirror's focal point also serves as the focal point of a spherical mirror that redirects light rays collected by the hyperboloidal mirror only a fraction of the light rays reaching the spherical mirror are reflected off of a beam splitter which redirects the light rays onto photographic film that records the image. Unfortunately, the optical losses involved in this approach are significant. Furthermore, with the Brueggemann approach and other full circumferential viewing systems, no higher resolution information is obtained, since these systems do not focus in on a smaller region of interest.

There are, however, some optical monitoring applications that require both low resolution monitoring of a wide region as well as higher resolution monitoring of a smaller region. One such situation, for example, is the case of bullets being fired from an unknown location on the ground or from a building. Since it is possible to suppress or conceal the flash emanating from the muzzle of a firearm, tracking the trajectory of the bullet itself by monitoring its infrared signature (especially observing wavelengths between 3 and 5 microns, a spectral region in which the absorption of the atmosphere is minimal) may provide the only clue as to where the bullet was fired. Additionally, it should be noted that when events of very short temporal duration are to be observed, coverage of the panorama using a scanning technique is inferior to the use of a staring technique. In the former, a smaller number of detectors are optically moved across the scene and may miss an event, while in the latter, a larger number of detectors is held fixed on the scene, providing continuous coverage of short temporal duration events. Tracking the bullet's trajectory through low resolution monitoring of a wide panoramic region could establish the general vicinity where the shooting originated, to be followed by higher resolution monitoring of this vicinity to establish the precise location.

SUMMARY OF THE INVENTION

In accordance with the present invention, an optical apparatus is disclosed in which both low and high resolution imaging systems have been integrated into one device. The preferred application for the invention is an optical system for a staring sensor that provides two simultaneous fields of view: 1) a low resolution (typically 2–5 mrad), panoramic mode with a field of view up to 360 degrees in the azimuth (i.e., the full panorama) and 2) a steerable, high resolution mode (typically 0.5 mrad) for monitoring a smaller fraction of the panorama. For monitoring urban sniper fire, the panoramic portion of the device is constructed to accept a field of view of approximately 40 degrees in the elevational direction (e.g., extending from 35 degrees above the horizon to 5 degrees below it), whereas for a rural setting 20 degrees might be sufficient. Furthermore, the invention is better designed for monitoring infrared radiation than previous devices.

The preferred embodiment of the invention uses a three dimensional mirror that has a convex surface of revolution (e.g., a hyperboloid) that is aligned about an axis, with a section cut out that is centered about this axis. Because it has a hole, it is designated here as an annular convex mirror. In the preferred implementation of the device, the annular convex mirror is used for collecting a low resolution image (photons) over the full, 360 degree panoramic view, but the view in the elevational direction is restricted to a fraction of the hemisphere (i.e. less than 90 degrees).

The preferred embodiment also employs a mirror that sits above the hole of the annular convex mirror. This mirror forms part of the high resolution optical system that is used to monitor a smaller portion of the panorama. It is designated here as the pointing mirror, since it can be both rotated and tilted. A set of lenses or other optical components is used to direct the high resolution image collected by the pointing mirror through the hole in the annular convex mirror. Another set of lenses or optical components redirects both this image as well as the low resolution, panoramic view towards a focal plane and onto different portions of a detector array comprising many pixels, allowing the high and low resolution images to be analyzed separately. The detector preferably is a two-dimensional focal plane array of pixels for detecting infrared radiation between nominally 3 and 5 microns, which is suitable for tracking a bullet.

A significant advantage of the invention is that the entire panorama can be monitored in low resolution while simultaneously monitoring a portion of the panorama in high resolution, thereby integrating two traditionally different functions into one device. Another advantage is that, since two independent images are generated, the full cross section of the detector can be utilized, whereas imaging the panorama alone onto the detector would utilize only an annular portion of the detector and leave the center of the detector unused. Furthermore, depending upon the mirror configuration, either higher or lower elevational angles of the panorama can be imaged away from the detector's center, thereby effectively enhancing the resolution.

Further features and advantages of the invention will be apparent to those skilled in the art from the following detailed description, taken together with the accompanying drawings.

DETAILED DESCRIPTION OF THE INVENTION

Figure 1:
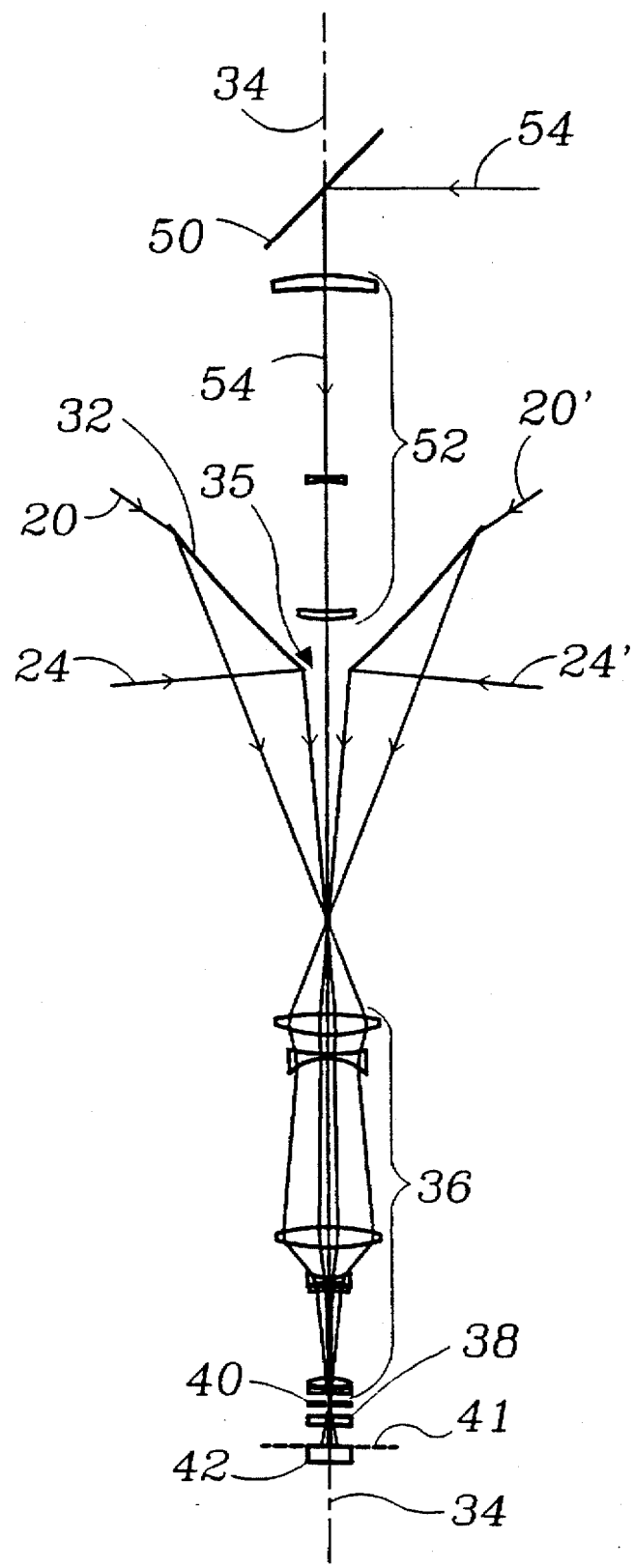
FIG. 1 is a cross sectional view including raytraces of one embodiment of the present invention, specifically, that embodiment in which higher elevational angles of the panorama are imaged further away from the detector's center.

As shown in the accompanying drawings, the present invention is directed to an optical apparatus that can simultaneously monitor the entire panorama in low resolution as well as a smaller, selected portion of the panorama in high resolution. One embodiment of the present invention, in which higher elevational angles of the panorama are imaged further away from the detector's center, is shown in FIG. 1. In this and the subsequent figures, raytraces illustrate the path that light beams (photons) take before they are detected. The term light is used broadly here to encompass both visible and invisible photons. Incoming light rays 20, 20', 24 and 24' strike an annular convex mirror 32 that is constructed out of aluminum or some other material (generally a metal) that is reflective at the wavelength of the incoming rays. Alternatively, a non-reflecting or partially reflecting surface can be coated for a given wavelength or spectral region. The mid-infrared region of the spectrum (3–5 microns) is frequently used for tracking projectiles. FIG. 1 only shows a cross-section of convex mirror 32, which is a three dimensional object that is preferably symmetrically aligned about an axis 34. Thus, mirror 32 is used for viewing the entire 360 degree panorama. A hole 35 in the center of convex mirror 32 allows for the passage of light rays from a selected portion of the panorama, as discussed below. Convex mirror 32 can have one of many kinds of convex surfaces, such as an ellipsoid, paraboloid, or hyperboloid, although the best image quality is obtained with a hyperboloidal surface. Furthermore, mirror 32 can be constructed so that a desired fraction of the hemisphere is subtended, which for bullet tracking applications in a rural environment might be as little as 20 degrees in the elevational direction. On the other hand, applications in an urban setting could require subtending 40 degrees. For example, convex mirror 32 can be shaped so that the elevational view extends from 5 degrees below the horizon to 35 degrees above the horizon, as in FIG. 1. Alternatively, mirror 32 might be contoured so that the elevational field of view extends from the horizon to 40 degrees above the horizon. Precisely how convex mirror 32 is shaped depends upon the particular application.

The mirror 32 reflects the incoming light rays 20, 20', 24 and 24' onto a set 36 of optical components such as lenses that are aligned about the axis 34. Lens set 36 images the panorama through a vacuum window 38 and then an iris 40 towards a focal plane 41. This permits the iris 40 to be vacuum cooled. A detector 42 for detecting photons is situated subsequent to the iris 40. Although FIG. 1 shows lens set 36 as being composed of seven lenses, there are many combinations of lenses and other optical components that could be used to reimage the panorama onto detector 42. All of the components shown in FIG. 1 and the other figures below are enclosed in a suitable housing or are otherwise securely mounted to each other. The relationship between the incoming light rays 20, 20', 24 and 24', the iris 40 and the detector 42 is discussed more fully below in connection with FIG. 2. Various infrared transmitting materials may be used for window 38, such as sapphire or silicon. Window 38 isolates detector 42 from atmosphere, allowing the detector to be vacuum-cooled. The detection of photons in the mid-infrared portion of the spectrum (nominally 3–5 microns) generally requires active, cryogenic cooling of the detection apparatus. Iris 40, on the other hand, serves as an aperture stop, thereby masking out undesirable light. The iris 40 can be constructed out of metal or other opaque material and also serves in part as a cold shield for detector 42. A 480×480 array of cooled, indium antimonide (InSb) pixels 43 functions well as detector 42, with each pixel 43 approximately 20 microns×20 microns in size. However, many different materials may be used for detector 42, and different geometrical arrangements of pixels are possible as well. Detectors used in the infrared portion of the spectrum are discussed in "Infrared Detectors," Hudson and Hudson, Editors, Dowden, Hutchinson and Ross, Inc., 1975.

Figure 2:
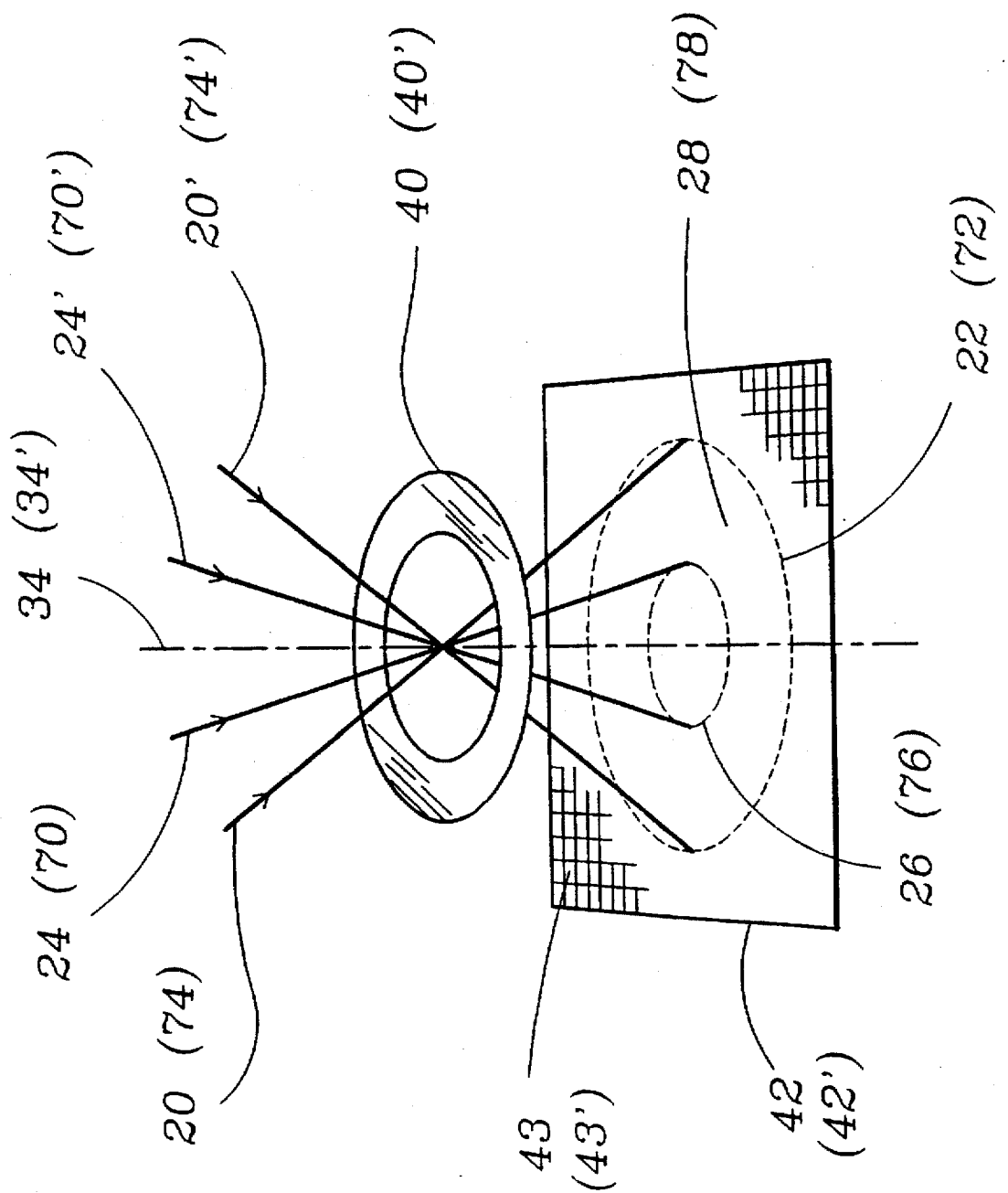
FIG. 2 is a perspective view of a portion of the invention which shows how light rays are imaged onto the surface of the detector.

FIG. 2 illustrates the relationship between the incoming light rays 20, 20', 24 and 24', iris 40, and pixels 43 of detector 42. For the sake of clarity, the window 38 is not shown. After passing through lens set 36 and iris 40, the incoming light rays 20, 20', 24 and 24' are imaged through the window 38 (not shown) onto the surface of detector 42 which comprises many pixels 43. Light rays 20 and 20' have an elevational angle (i.e. the angle they make with respect to the horizon) greater than that of light rays 24 and 24', as seen in FIG. 1. In this embodiment of the invention, light rays 20 and 20' are imaged onto the pixels 43 further from axis 34 than are light rays 24 and 24'. Light rays having an elevational angle equal to that of light rays 20 and 20' are imaged into a circle of light 22 on the pixels 43. Likewise, light rays having an elevational angle equal to that of rays 24 and 24' form a circle of light 26. Accordingly, light rays reaching the pixels 43 and having an angle of elevation between these two angles form an annulus of light 28 that is defined by circles of light 22 and 26. In the embodiment of the invention shown in FIG. 1, photons having greater elevational angles are imaged further away from the center of detector 42, which is preferably aligned along axis 34. Since detector 42 is composed of an array of numerous pixels 43, each pixel 43 effectively subtends a certain solid angle of the space being monitored. Since from geometry considerations there must be more pixels intersected by circles located further away from the center of detector 42 than by ones closer to it, the resolution of the panorama for higher elevational angles in FIG. 1 is higher than the resolution for lower elevational angles. Thus, FIG. 1 represents an embodiment of the invention that is best suited for those applications requiring higher resolution at higher elevational angles.

By electronically reading the light intensity registered at the pixels 43 of detector 42 periodically, the trajectory of an object being tracked can be calculated using computational algorithms based on Newtonian physics, after correcting for the distortions that are introduced by convex mirror 32. The use of detection and tracking algorithms are discussed in "Imaging Infrared: Scene Simulation, Modeling, and Real Image Tracking," August J. Huber, Milton J. Triplett and James R. Wolverton, Editors, Proceeding of SPIE, vol. 1110, 1989. Mathematical transformations for removing optical distortion are discussed in "Digital Picture Processing," 2nd edition, vol. 2, A. Rosenfeld and A. Kak, Editors, Academic Press, Inc., 1982. Information on two dimensional staring arrays and how they are read out electronically can be found in "Staring Infrared Focal Plane Technology," Pocock, Editor, Proceedings of SPIE, vol. 267, 1981.

A portion of the panorama can also be imaged in high resolution with a pointing mirror 50 shown in FIG. 1. The pointing mirror 50 is used for spacial pointing and tracking for both the azimuthal (360 degrees) and elevational (90 degrees) angles. It is situated above a set 52 of optical components such as lenses, and like convex mirror 32, pointing mirror 50 is oriented along axis 34. The pointing mirror 50 reflects photons represented by incoming light ray 54 from a desired portion of the panorama onto the lens set 52, which operates on incoming light rays in such a manner so as to harmoniously direct them through lens set 36 towards focal plane 41 and onto pixels 43 near axis 34. Lens set 52 is shown here comprising three lenses that function as an objective lens which produces an image that mates with the image formed by lens set 36. However, other combinations of optical components can be used. The transmission of lenses and other optical components can be enhanced by the application of anti-reflection coatings, which can be tailored for specific wavelengths. An optical prescription for the embodiment of the invention shown in FIG. 1 is given at the end of the specification.

Figure 3:
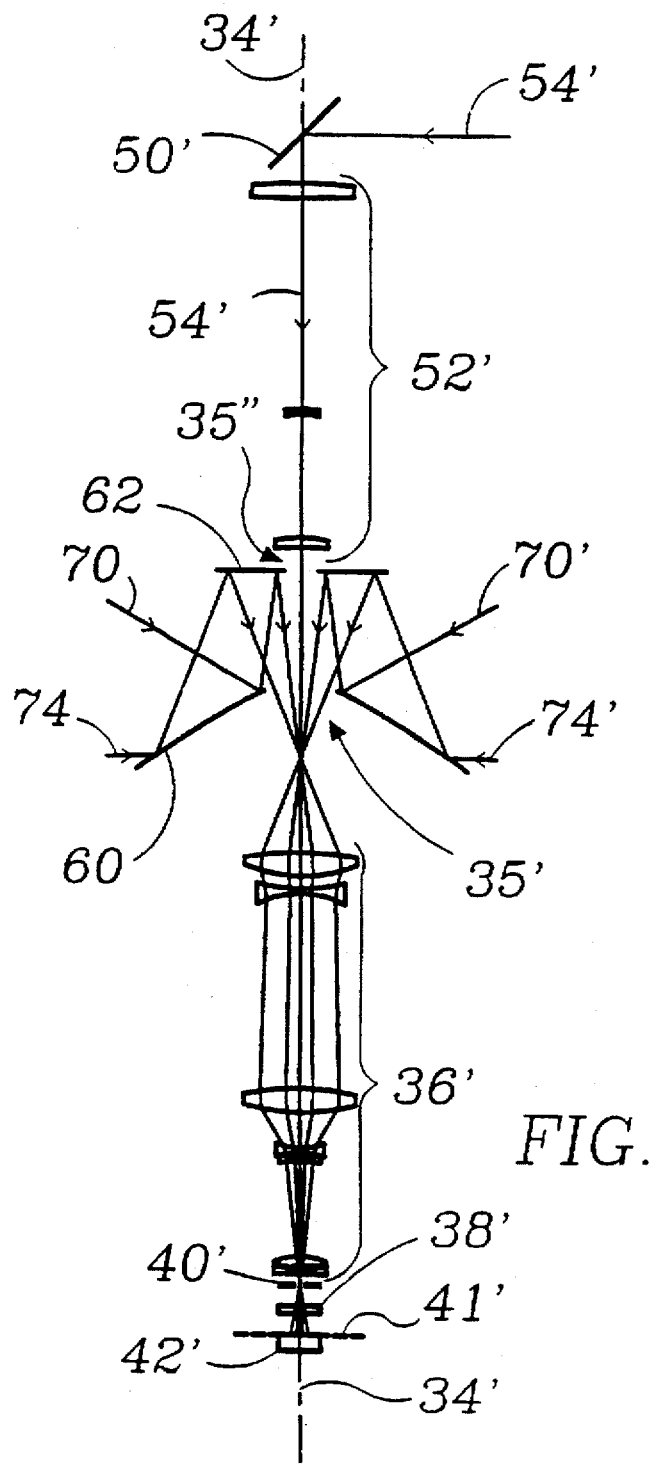
FIG. 3 is a cross sectional view including raytraces of another embodiment of the present invention, specifically, that embodiment in which lower elevational angles of the panorama are imaged further away from the detector's center.

Another embodiment of the invention is shown in FIG. 3. The prime numbered elements in FIG. 3 function substantially the same as their unprimed counterparts of FIG. 1. However, convex mirror 32 in FIG. 1 has been replaced by two mirrors, a convex annular mirror 60 acting in conjunction with a fold mirror 62 that inverts the optical path. Fold mirror 62 is a flat, annular mirror situated above the convex mirror 60. Convex annular mirror 60 has a hole 35', and the fold mirror 62 has a hole 35". Mirrors 60 and 62 are both preferably aligned symmetrically about an axis 34'. The curvature of convex mirror 60 is typically less steep than that of convex mirror 32 in FIG. 1. Convex mirror 60 is shown in FIG. 3 collecting an image extending from 5 degrees below the horizon to 30 degrees above the horizon, although other ranges could have also been selected, with convex mirror 60 being constructed accordingly. As in FIG. 1, a set 36' of optical components such as lenses images the panorama through an iris 40' towards a focal plane 41' and onto pixels 43' extending across the surface of a detector 42'. Since the optical path is inverted, however, lower elevational angles of the panorama are imaged closer to the axis 34', as opposed to the case illustrated in FIG. 1. The configuration of FIG. 3 would therefore be suitable for those applications requiring enhanced resolution of objects at lower elevational angles or near the horizon.

This is shown more clearly in FIG. 2, which illustrates the relationship between incoming light rays 70, 70', 74 and 74', the iris 40', and pixels 43' of detector 42'. As shown in FIG. 3, light rays 70 and 70' have an elevational angle greater than that of light rays 74 and 74'. In this embodiment of the invention, light rays 70 and 70' are imaged onto the pixels 43' closer to the axis 34' than are light rays 74 and 74'. Light rays having an elevational angle equal to that of light rays 70 and 70' are imaged into a circle of light 76 on the pixels 43', and light rays having an elevational angle equal to that of light rays 74 and 74' form a circle of light 72. Accordingly, light rays reaching the pixels 43' and having angles of elevation between these two angles form an annulus of light 78 that is defined by circles of light 72 and 76. In this embodiment of the invention, lower elevational angles of the panorama are imaged onto the pixels 43' further away from the axis 34'. This is the opposite of the case illustrated in FIG. 1, and thus the resolution of the panorama at lower elevational angles in FIG. 3 is higher than the resolution at higher elevational angles. Thus, FIG. 3 shows an embodiment of the invention suitable for applications requiring higher resolution of objects located at lower elevational angles.

An optical prescription for the embodiment of the invention shown in FIG. 1 is given in Tables 1 and 2, for the narrow field (high resolution) and panoramic (low resolution) optical paths, respectively. Table 3 lists various optical characteristics corresponding to the optical prescription detailed in Tables 1 and 2. Tables 4–6 give analogous information for the embodiment of the invention shown in FIG. 3. The optical prescriptions given in these Tables were used to generate FIGS. 1 and 3, except that the vacuum window 38 (38') and pointing mirror 50 (50') were later added to FIGS. 1 and 3 and are not contained in the optical prescriptions disclosed herein. The various reflective and refractive surfaces in the optical prescriptions are generated with the well known surface sag formula, in which the coefficients needed for this formula appear in the Tables. Each prescription generates an optical design by starting at the focal plane 41 (41') and working towards either mirror 50 (50') or 32 (60), i.e. opposite the direction that photons take in propagating towards the detector 42 (42'). Accordingly, the radius of curvature (denoted as "RD" in the Tables) is taken to be positive if the optical surface in question has a center of curvature that is further away (in the optical path sense) from the focal plane 41 (41') than is the optical surface itself. Likewise, a positive thickness ("TH" in the tables) between surfaces indicates that the surface being described is further away (in the optical path sense) from the focal plane 41 (41') than the previously listed surface. The medium listed in the last column of each table is that medium encountered when propagating from the surface described by the coefficients in that row, towards mirrors 50 (50') or 32 (60), and away from the focal plane 41 (41').

TABLE 1

Optical prescription for those components defining the narrow field of view of FIG. 1.

| SURFACE | RD | CC | D | E | F | G | TH | MEDIUM |
|---|---|---|---|---|---|---|---|---|
| 0 | 0.00E+00 | | | | | | 1 | AIR |
| 1 | 0.00E+00 | | | | | | 0.235327 | AIR |
| 2 | 47.5067 | 0.00E+00 | −0.1014 | −4.11E−02 | −1.3084 | 6.6667 | 0.1 | ZNS |
| 3 | 3.02018 | | | | | | 4.86E−02 | AIR |
| 4 | 4.35441 | 0.00E+00 | −1.71E−02 | 1.00E−01 | 9.47E−02 | −1.0869 | 0.2 | ZNSE |
| 5 | −1.34491 | | | | | | 2.00473 | AIR |
| 6 | −2.77542 | 0.00E+00 | 0.33403 | −0.88742 | 2.7039 | −1.8174 | 0.1 | ZNS |
| 7 | 4.51004 | | | | | | 0.107649 | AIR |

TABLE 1-continued

Optical prescription for those components defining the narrow field of view of FIG. 1.

| SURFACE | RD | CC | D | E | F | G | TH | MEDIUM |
|---|---|---|---|---|---|---|---|---|
| 8 | −1.097 | | | | | | 0.1 | CAF2 |
| 9 | 1.0043 | | | | | | 0.716886 | AIR |
| 10 | 2.98354 | 0.00E+00 | −6.75E−02 | 4.44E−02 | −2.03E−02 | 3.84E−03 | 0.5 | ZNSE |
| 11 | −4.47541 | | | | | | 2.33028 | AIR |
| 12 | 0.00E+00 | | | | | | 1.61784 | AIR |
| 13 | −1.29886 | | | | | | 0.1 | CAF2 |
| 14 | 3.84397 | | | | | | 0.442046 | AIR |
| 15 | 2.50648 | 0.00E+00 | −4.41E−02 | 1.61E−02 | −7.76E−03 | 1.55E−03 | 0.5 | ZNSE |
| 16 | −6.57057 | | | | | | 1.9286 | AIR |
| 17 | 0.00E+00 | | | | | | 5.796 | AIR |
| 18 | 0.00E+00 | | | | | | 0.536207 | AIR |
| 19 | 0.00E+00 | | | | | | 1 | AIR |
| 20 | 2.44543 | | | | | | 0.2 | ZNSE |
| 21 | 4.80933 | | | | | | 3.08264 | AIR |
| 22 | −2.2822 | | | | | | 0.1 | ZNS |
| 23 | 3.8753 | 0.00E+00 | 4.16E−02 | −2.0204 | 7.3627 | 0.00E+00 | 4.31745 | AIR |
| 24 | −11.9704 | 0.00E+00 | 9.69E−04 | −2.22E−03 | 1.61E−03 | −4.37E−04 | 0.3 | ZNSE |
| 25 | −4.80533 | | | | | | 2 | AIR |
| 26 | 0.00E+00 | | | | | | | |

TABLE 2

Optical prescription for those components defining the panoramic field of view of FIG. 1.

| SURFACE | RD | CC | D | E | F | G | TH | MEDIUM |
|---|---|---|---|---|---|---|---|---|
| 0 | 0.00E+00 | | | | | | 1 | AIR |
| 1 | 0.00E+00 | | | | | | 0.235327 | AIR |
| 2 | 47.5067 | 0.00E+00 | −0.1014 | −4.11E−02 | −1.3084 | 6.6667 | 0.1 | ZNS |
| 3 | 3.02018 | | | | | | 4.86E−02 | AIR |
| 4 | 4.35441 | 0.00E+00 | −1.71E−02 | 1.00E−01 | 9.47E−02 | −1.0869 | 0.2 | ZNSE |
| 5 | −1.34491 | | | | | | 2.00473 | AIR |
| 6 | −2.77542 | 0.00E+00 | 0.33403 | −0.88742 | 2.7039 | −1.8174 | 0.1 | ZNS |
| 7 | 4.51004 | | | | | | 0.107649 | AIR |
| 8 | −1.097 | | | | | | 0.1 | CAF2 |
| 9 | 1.0043 | | | | | | 0.716886 | AIR |
| 10 | 2.98354 | 0.00E+00 | −6.75E−02 | 4.44E−02 | −2.03E−02 | 3.84E−03 | 0.5 | ZNSE |
| 11 | −4.47541 | | | | | | 2.33028 | AIR |
| 12 | 0.00E+00 | | | | | | 1.61784 | AIR |
| 13 | −1.29886 | | | | | | 0.1 | CAF2 |
| 14 | 3.84397 | | | | | | 0.442046 | AIR |
| 15 | 2.50648 | 0.00E+00 | −4.41E−02 | 1.61E−02 | −7.76E−03 | 1.55E−03 | 0.5 | ZNSE |
| 16 | −6.57057 | | | | | | 1.9286 | AIR |
| 17 | 0.00E+00 | | | | | | 5.86816 | AIR |
| 18 | 0.408728 | −1.8709 | 7.51E−04 | 6.09E−05 | 5.48E−08 | −1.42E−07 | 0.00E+00 | MIRROR |
| 19 | 0.00E+00 | | | | | | −5 | AIR |
| 20 | 0.00E+00 | | | | | | | |

| | PANORAMIC FIELD OF VIEW | NARROW FIELD OF VIEW |
|---|---|---|
| Field of view (degrees) | 40 elevation × 360 azimuth (Elevation: −5 to +35) | 3.0 dia. |
| Focal length (inch) | 0.20 | 1.60 |
| Aperture dia. (inch) | 0.10 | 0.80 |
| F-number | F/2.0 | F/2.0 |

-continued

| | PANORAMIC FIELD OF VIEW | NARROW FIELD OF VIEW |
|---|---|---|
| Pixel width/length (inch) | 0.0008 | 0.0008 |
| Pixel subtense (milliradians) | 4.0 | 0.5 |

TABLE 4

Optical prescription for those components defining the narrow field of view of FIG. 3.

| SURFACE | RD | CC | D | E | F | G | TH | MEDIUM |
|---|---|---|---|---|---|---|---|---|
| 0 | 0.00E+00 | | | | | | 1 | AIR |
| 1 | 0.00E+00 | | | | | | 0.220442 | AIR |
| 2 | 45.2615 | 0.00E+00 | −0.10001 | −4.86E−02 | −1.305 | 6.4377 | 0.1 | ZNS |
| 3 | 3.01406 | | | | | | 4.86E−02 | AIR |
| 4 | 4.38672 | 0.00E+00 | −1.61E−02 | 0.10753 | 6.81E−02 | −0.98468 | 0.2 | ZNSE |
| 5 | −1.34782 | | | | | | 1.98608 | AIR |
| 6 | −2.9013 | 0.00E+00 | 0.23127 | −1.0686 | 4.5759 | −9.291 | 0.1 | ZNS |
| 7 | 4.92116 | | | | | | 8.97E−02 | AIR |
| 8 | −1.53182 | | | | | | 0.1 | CAF2 |
| 9 | 1.2653 | | | | | | 0.732904 | AIR |
| 10 | 3.12499 | 0.00E+00 | −6.06E−02 | 4.39E−02 | −2.76E−02 | 7.73E−03 | 0.5 | ZNSE |
| 11 | −5.1217 | | | | | | 2.28353 | AIR |
| 12 | 0.00E+00 | | | | | | 1.75684 | AIR |
| 13 | −1.85301 | | | | | | 0.1 | CAF2 |
| 14 | 3.13682 | | | | | | 0.259932 | AIR |
| 15 | 2.45488 | 0.00E+00 | −3.95E−02 | 1.64E−02 | −1.06E−02 | 2.78E−03 | 0.5 | ZNSE |
| 16 | −6.29766 | | | | | | 1.76879 | AIR |
| 17 | 0.00E+00 | | | | | | 4.1 | AIR |
| 18 | 0.00E+00 | | | | | | 0.00E+00 | AIR |
| 19 | 0.00E+00 | | | | | | 0.5 | AIR |
| 20 | −5.10598 | | | | | | 0.2 | ZNSE |
| 21 | −2.08456 | | | | | | 2.5641 | AIR |
| 22 | −0.97763 | | | | | | 0.1 | ZNS |
| 23 | −3.26598 | | | | | | 4.33598 | AIR |
| 24 | 28.7161 | 0.00E+00 | −4.97E−04 | −1.36E−04 | 5.99E−05 | 0.00E+00 | 0.3 | ZNSE |
| 25 | −9.76195 | | | | | | 1 | AIR |
| 26 | 0.00E+00 | | | | | | | |

TABLE 5

Optical prescription for those components defining the panoramic field of view of FIG 3.

| SURFACE | RD | CC | D | E | F | G | TH | MEDIUM |
|---|---|---|---|---|---|---|---|---|
| 1 | 0.0000 | | | | | | 0.2204 | AIR |
| 2 | 45.2615 | 0 | −0.1000 | −0.0486 | −1.3050 | 6.4377 | 0.1 | ZNS |
| 3 | 3.0141 | | | | | | 0.0486 | AIR |
| 4 | 4.3867 | 0 | −0.0161 | 0.1075 | 0.0681 | −0.9847 | 0.2 | ZNSE |
| 5 | −1.3478 | | | | | | 1.9861 | AIR |
| 6 | −2.9013 | 0 | 0.2313 | −1.0686 | 4.5759 | −9.2910 | 0.1 | ZNS |
| 7 | 4.9212 | | | | | | 0.0897 | AIR |
| 8 | −1.5318 | | | | | | 0.1 | CAF2 |
| 9 | 1.2653 | | | | | | 0.7329 | AIR |
| 10 | 3.1250 | 0. | −6.06E−02 | 4.39E−02 | −2.76E−02 | 7.73E−03 | 0.5 | ZNSE |
| 11 | −5.1217 | | | | | | 2.2835 | AIR |
| 12 | 0.0000 | | | | | | 1.7568 | AIR |
| 13 | −1.8530 | | | | | | 0.1 | CAF2 |
| 14 | 3.1368 | | | | | | 0.2599 | AIR |
| 15 | 2.4549 | 0. | −3.95E−02 | 1.64E−02 | −1.06E−02 | 2.78E−03 | 0.5 | ZNSE |
| 16 | −6.2977 | | | | | | 1.7688 | AIR |
| 17 | 0.0000 | | | | | | 4.1 | AIR |
| 18 | 0.0000 | | | | | | 0.0 | MIRROR |
| 19 | 0.0000 | | | | | | −2.2532 | AIR |
| 20 | −1.0034 | −3.6846 | −1.80E−03 | 6.88E−05 | −2.44E−06 | 9.66E−08 | 0.0 | MIRROR |
| 21 | 0.0000 | | | | | | 4.0 | AIR |

|  | PANORAMIC FIELD OF VIEW | NARROW FIELD OF VIEW |
|---|---|---|
| Field of view (degrees) | 35 elevation × 360 azimuth (Elevation: −5 to +30) | 3.0 dia. |
| Focal length (inch) | 0.20 | 1.60 |
| Aperture dia. (inch) | 0.10 | 0.80 |
| F-number | F/2.0 | F/2.0 |
| Pixel width/length (inch) | 0.0008 | 0.0008 |
| Pixel subtense (milliradians) | 4.0 | 0.5 |

While particular embodiments of the invention have been shown and described, numerous variations and alternate embodiments will occur to those skilled in the art.

Accordingly, it is intended that the invention be limited only in terms of the appended claims.

I claim:

1. An optical apparatus for panoramic field of view observation as well as simultaneous observation of a narrower field of view, said optical apparatus comprising:
   an annular convex mirror for collecting photons from said panoramic field of view, said annular convex mirror having a hole therein;
   a pointing mirror for collecting photons from said narrower field of view;
   a first set of optical components for collecting photons from said pointing mirror, said first set of optical components imaging photons through said hole in said annular convex mirror; and
   a second set of optical components for collecting photons both from said annular convex mirror and from said first set of optical components, wherein said first and second sets of optical components and said annular convex and pointing mirrors are aligned along an axis.

2. The apparatus of claim 1, wherein photons collected by said second set of optical components are imaged towards a focal plane.

3. The apparatus of claim 2, wherein photons collected by said annular convex mirror and photons collected by said pointing mirror are imaged towards different portions of said focal plane.

4. The apparatus of claim 3, wherein photons collected by said annular convex mirror originating at increasingly higher elevational angles are imaged towards said focal plane progressively further away from said axis.

5. The apparatus of claim 4, wherein said first and second sets of optical components include lenses.

6. The apparatus of claim 4, wherein said apparatus further comprises an iris aligned along said axis that is positioned between said second set of optical components and said focal plane.

7. The apparatus of claim 6, wherein said apparatus further comprises a detector for detecting photons.

8. The apparatus of claim 7, wherein said detector can detect photons having a wavelength between nominally 3 and 5 microns.

9. The apparatus of claim 4, wherein photons collected by said annular convex mirror and imaged towards said focal plane originate within an approximately 20 degree field of view as measured in an elevational direction.

10. The apparatus of claim 4, wherein photons collected by said annular convex mirror and imaged towards said focal plane originate within an approximately 40 degree field of view as measured in an elevational direction.

11. The apparatus of claim 3, further comprising a third mirror having a hole therein, wherein said third mirror is aligned along said axis and images photons collected by said annular convex mirror through said second set of optical components, such that photons collected by said annular convex mirror originating at increasingly higher elevational angles are imaged towards said focal plane progressively closer to said axis.

12. The apparatus of claim 11, wherein said first and second sets of optical components include lenses.

13. The apparatus of claim 11, wherein said apparatus further comprises an iris aligned along said axis that is positioned between said second set of optical components and said focal plane.

14. The apparatus of claim 13, wherein said apparatus further comprises a detector for detecting photons.

15. The apparatus of claim 14, wherein said detector can detect photons having a wavelength between nominally 3 and 5 microns.

16. The apparatus of claim 11, wherein photons collected by said annular convex mirror and imaged towards said focal plane originate within an approximately 20 degree field of view as measured in an elevational direction.

17. The apparatus of claim 11, wherein photons collected by said annular convex mirror and imaged towards said focal plane originate within an approximately 40 degree field of view as measured in an elevational direction.

18. An optical apparatus for panoramic field of view observation as well as simultaneous observation of a narrower field of view, said optical apparatus comprising:
   one convex mirror for collecting photons from said panoramic field of view, said mirror having a hole therein;
   a pointing mirror for collecting photons from said narrower field of view;
   a first set of optical components for imaging photons collected from said pointing mirror through said hole in said convex mirror; and
   a second set of optical components for imaging photons collected from said convex mirror, wherein photons collected from said pointing and convex mirrors are imaged towards different locations in space.

19. The apparatus of claim 18, wherein photons collected from said panoramic and narrower fields of view are imaged towards different portions of a focal plane.

20. The apparatus of claim 18, further comprising:
   an iris situated between said first set of optical components and said focal plane; and
   a detector for detecting photons.

* * * * *